3,542,514
PREPARATION OF ZINC HYDRIDE
Guenther Fritz Lengnick, Manitou Beach, Mich., assignor to Stauffer Chemical Company, New York, N.Y., a corporation of Delaware
No Drawing. Continuation-in-part of application Ser. No. 408,750, Nov. 4, 1964. This application May 9, 1968, Ser. No. 728,051
Int. Cl. C01b 6/02
U.S. Cl. 23—204                4 Claims

ABSTRACT OF THE DISCLOSURE

Zinc hydride is produced by reaction of a zinc halide or zinc cyanide with an alkyl aluminum hydride.

---

The present application is a continuation-in-part of application Ser. No. 408,750, filed Nov. 4, 1964, which is hereby abandoned.

This invention relates to a process for the preparation of zinc hydride.

It is a principal object of the invention to provide a process characterized in the high conversion of the zinc in the zinc-containing reactant to zinc hydride.

In the practice of this invention, a zinc halide or zinc cyanide is reacted with a compound of the formula $R_yAlH_{3-y}$ in which each R is an alkyl radical containing from 2 to 6 carbon atoms and $y$ is an integer of from 1 to 2. The reaction according to the invention is carried out at a temperature of from about —100° C. to about +40° C. in an inert atmosphere in the presence of a solvent.

The zinc compound applied as the reactant is most preferably zinc chloride, while the preferred alkyl aluminum hydride is one containing two alkyl groups, e.g., di-isobutylaluminum hydride.

The reaction here involved in believed illustrated by the following equation which is not to be taken as limitative of the invention:

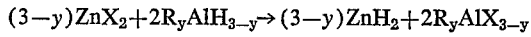

$$(3-y)ZnX_2 + 2R_yAlH_{3-y} \rightarrow (3-y)ZnH_2 + 2R_yAlX_{3-y}$$

where X is a halogen or cyano and R and $y$ are as previously defined.

The reaction, as before indicated, must be performed in an inert atmosphere, such as a nitrogen, helium or argon atmosphere, possibly augmented by the vapor of the solvent. Optimum results are generally achieved if the operating temperature is maintained within the range —80° C. to —10° C.

A solvent employed according to the invention should be a solvent for both reactants and should be inert with respect thereto and the products of the reaction. Ethers have been found to be particularly effective and are therefore preferred. Examples of suitable ethers include diethyl ether, isobutyl propyl ether, 1,2-dimethoxyethane, bis-beta-ethoxyethyl ether, bis-beta-methoxyethyl ether, p-dioxane and tetrahydrofuran.

In the execution of the process herein, the alkyl aluminum hydride is normally used in slight stoichiometric excess and is applied in solution in the selected solvent to a solvent dispersion of the zinc-containing reactant. As the latter goes into solution, the zinc hydride reaction product settles out as a white precipitate which can be removed by filtration and purified by washing with additional cold solvent. Yields of zinc hydride above 90 percent, calculated on the applied zinc metal, can be expected.

It is advantageous to store the zinc hydride at about —20° C. under nitrogen to prevent decomposition. Such compound is useful, for example, as a reagent in the reduction of metal alkyls to metals and alkanes.

The invention is further illustrated by the following examples:

EXAMPLE 1

A solution of 0.395 mole of di-isobutylaluminum hydride in 100 ml. ether is added dropwise with stirring over a period of one hour to a —40° C. solution of anhydrous zinc chloride (0.178 mole) in 220 ml. of diethyl ether under a nitrogen atmosphere. The reaction mixture is stirred an additional 1.25 hours while maintaining the temperature at —40° C. Then the precipitate is washed repeatedly with cold (—40° C.) ethyl ether and heptane to remove byproducts. The solvents are removed by vacuum drying. A yield of 92 percent zinc hydride, calculated on the zinc contained in the zinc chloride, is realized.

EXAMPLE 2

Di-isobutylaluminum hydride (0.67 mole) in 300 ml. of diethyl ether is added during a 30 minute period to 0.31 mole of zinc iodide in 300 ml. of diethyl ether at —78° C. The reaction mixture is stirred for an additional hour after which the white zinc hydride precipitate is filtered off and washed with cold dry ether. A product yield comparable to Example 1 is attained. Bis-beta-ethoxyethyl ether and dioxane can each be substituted for the diethyl ether in this example to produce similar results.

EXAMPLE 3

When $Zn(CN)_2$ is substituted mol per mol for the zinc chloride in Example 1, similar results obtain.

EXAMPLE 4

When either diethylaluminum hydride or hexylaluminum dihydride is substituted for the di-isobutylaluminum hydride of Example 1, a similar yield of zinc hydride results.

It is understood that, in accordance with the provisions of the patent statutes, variations and modifications of the subject invention may be made without departing from the spirit thereof.

The invention claimed is:

1. The method of preparing zinc hydride which comprises reacting zinc cyanide with a compound of the formula $R_yAlH_{3-y}$ where each R is an alkyl radical containing from 2 to 6 carbon atoms and $y$ is an integer from 1 to 2 at a temperature of from about —100° C. to about +40° C. in an inert atmosphere in the presence of a mutual solvent for the reactants which is inert under the reaction conditions.

2. The method of claim 1 where the alkyl aluminum hydride is di-isobutylaluminum hydride.

3. The method of claim 2 where the solvent is an ether.

4. The method of claim 2 when the reaction is conducted at a temperature of from about —80° C. to —10° C.

References Cited

FOREIGN PATENTS 833,646    4/1960    Great Britain.

OTHER REFERENCES

Wiberg; "New Results In Preparative Hydride Research"; AEC-To-1931; U.S. Atomic Energy Commission; Apr. 8, 1954; pp. 12–21.

Coates, G.E.; Organo-Metallic Compounds; John Wiley & Sons; N.Y. 1961; p. 69.

OSCAR R. VERTIZ, Primary Examiner

G. O. PETERS, Assistant Examiner